US006781059B2

(12) United States Patent
Mizutani

(10) Patent No.: US 6,781,059 B2
(45) Date of Patent: Aug. 24, 2004

(54) SHIELDED WIRE

(75) Inventor: Yoshio Mizutani, Aichi (JP)

(73) Assignees: Sumitomo Wiring Systems, Ltd., Mie (JP); Autonetworks Technologies, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/379,657

(22) Filed: Mar. 6, 2003

(65) Prior Publication Data

US 2003/0221850 A1 Dec. 4, 2003

(30) Foreign Application Priority Data

Mar. 8, 2002 (JP) ....................................... 2002-064314

(51) Int. Cl.[7] ................................................ H02G 15/02
(52) U.S. Cl. ...................................... 174/75 C; 174/78
(58) Field of Search ................................ 174/75 C, 78, 174/102 SC, 74 R; 439/98, 610

(56) References Cited

U.S. PATENT DOCUMENTS 6,053,749 A 4/2000 Masuda et al.
6,452,102 B1 * 9/2002 DeForest et al. ......... 174/75 C

FOREIGN PATENT DOCUMENTS

JP A 11-26093 1/1999

* cited by examiner

*Primary Examiner*—Chau N. Nguyen
(74) *Attorney, Agent, or Firm*—Oliff & Berridge, PLC

(57) ABSTRACT

A plurality of insulated wires having a connector for connection to a device-side terminal at a distal end thereof are collectively enclosed in a single braided conductor. An open end portion of the braided conductor is expanded and is fitted to an inner shell. An outer shell is fitted to the open end portion. A heat-shrinkable tube made of a conductive resin is fitted to each insulated wire from the connector to a position where the braided conductor has thick meshes. A metal clamp is fastened on the outer peripheral surface of the braided conductor disposed at this position. Therefore, the heat-shrinkable tube on each insulated wire is held in contact with the braided conductor. Thereby, electrical noises will not leak to exterior through the open end portion having the coarse meshes and are grounded to a shield case via the heat-shrinkable tubes, the braided conductor, and the shield shell.

5 Claims, 3 Drawing Sheets

SHIELDED WIRE

The present disclosure relates to the subject matter contained in Japanese Patent Application No. 2002-064314 filed on Mar. 8, 2002, which is incorporated herein by reference in its entirety.

BACKGROUND OF THE INVENTION

1. Field of the Invention

The present invention relates to a shielded wire.

2. Description of the Related Art

For example, an inverter device mounted on an electric vehicle is connected a plurality of wires extending from other devices. JP-A-11-26093 discloses a structure for connecting these shielded wires. In this structure, attachment holes are formed in a shield case, which receives the inverter device therein, and device-side terminals disposed in the shield case face to the attachment holes, respectively. Then, connectors each fixedly secured to an end portion of the wire are inserted into the attachment holes, respectively to connect the device-side terminals with the connectors.

Incidentally, this kinds of shielded wire has a shield layer to prevent electrical noises generated from the inverter device or the like from leaking to the exterior. Generally, a flexibly-deformable tubular member, which is called a braided conductor, is used as this shielding layer. To connect the easily-deformable braided conductor with the shield case, a shield shell having high rigidity is fitted to an outer peripheral surface of a distal end portion of each braided conductor to attach the shield shell to the shield case in contact manner.

Here, to reduce the time and labor required for an assembling operation in a case of shielding a plurality of wires, there may be proposed a method in which these wires are collectively enclosed in a braided conductor, a single shield shell is fitted to an end portion of the braided conductor, and this shield shell is connected with a shield case. With this method, there is achieved an advantage that the time and labor required for the assembling operation is reduced since the only one shield shell is used.

In this kind of shielded wires, however, the distal end portions of the wires must be spaced apart from one another for insulating purposes, and in this connection the shield shell need to have a large size. Therefore, when fitting the shield shell to the end portion of the braided wire, the end portion of the braided wire must be expanded wide. As a result the meshes of the braid become coarse, which invites a problem that the shielding performance can be lowered.

SUMMARY OF THE INVENTION

This invention has been made under the above circumstances. An object of the invention is to provide a shield connector device capable of preventing from lowering the shielding performance.

The above object has been achieved by a shielded wire according to a first aspect of the invention. The shielded wire includes an insulated wire, a tubular braided conductor, a shield shell, and an auxiliary shielding layer. The tubular braided conductor encloses the insulated wire. The shield shell is disposed at an end portion of the insulated wire and has a larger diameter than the braided conductor. The auxiliary shielding layer is formed on an outer peripheral surface of the insulated wire in the vicinity of the shield shell where meshes of the braided conductor are coarse. The braided conductor is connected to the shield shell with an opening end portion of the braided conductor being expanded. The auxiliary shielding layer is electrically connected to the braided conductor.

According to a second aspect of the invention, in the shielded wire of the first aspect, the shield shell has an inner shell and an outer shell. The open end portion of the braided conductor is held between the inner shell and the outer shell so that the braided conductor is electrically connected to the shield shell.

According to a third aspect of the invention, the shielded wire of any one of the first and second aspects, further includes a fastening member. The fastening member holds the braided conductor from the outside thereof so that the braided conductor contacts the auxiliary shielding layer.

According to a fourth aspect of the invention, in the shielded wire according of the third aspect, the fastening member is disposed at a position corresponding to one end portion of the auxiliary shielding layer opposite to the other end portion thereof located in the vicinity of the shield shell.

According to a fifth aspect of the invention, in the shielded wire of any one of the first and third aspects, the auxiliary shielding layer is a heat-shrinkable tube made of a conductive resin, which covers on the insulated wire and is heated to shrink.

According to a sixth aspect of the invention, in the shielded wire of any one of the first and third aspects, the auxiliary shielding layer is a adhesive metal tape, which is wound on the insulated wire.

For example, when a braided conductor is used for shielding a cable connecting a power motor to an inverter device, this braided conductor is connected via a shield shell to a shield case containing the inverter device. In this condition, meshes of the braided conductor in the vicinity of an open end thereof are made coarse so that the shielding performance is lowered. Therefore, there is a fear that electrical noises generated from the inverter device leak through these meshes.

On the other hand, in the first aspect of the present invention, an auxiliary shielding layer is formed on an outer peripheral surface of the insulated wire in the vicinity of the shield shell where meshes of the braided conductor are coarse. In addition, the auxiliary shielding layer is electrically connected to the braided conductor. Therefore, electrical noises will not leak to the exterior through the meshes of the braided conductor and are grounded to the shield case via the auxiliary shielding layers and the braided conductor.

According to the third aspect of the invention, the auxiliary shielding layer on the insulated wire and the braided conductor are held in contact. Furthermore, even when an external force such as vibrations is applied, this contacted condition will not be affected. Therefore, the shielding is positively effected.

According to the fifth aspect of the invention, when the auxiliary shielding layer is formed of the heat-shrinkable tube, it is tightly mounted on the insulated wire. There will not be encountered a disadvantage that this tube is displaced or disengaged even upon application of an external force such as vibrations. Therefore, the more positive shielding effect is achieved.

According to the sixth aspect of the invention, when the auxiliary shielding layer is formed of the metal tape, this construction can be used in a general-purpose manner for a variety of insulated wires having different diameters and lengths.

DETAILED DESCRIPTION OF THE PREFERRED EMBODIMENTS

[First Embodiment]

Figure 1:
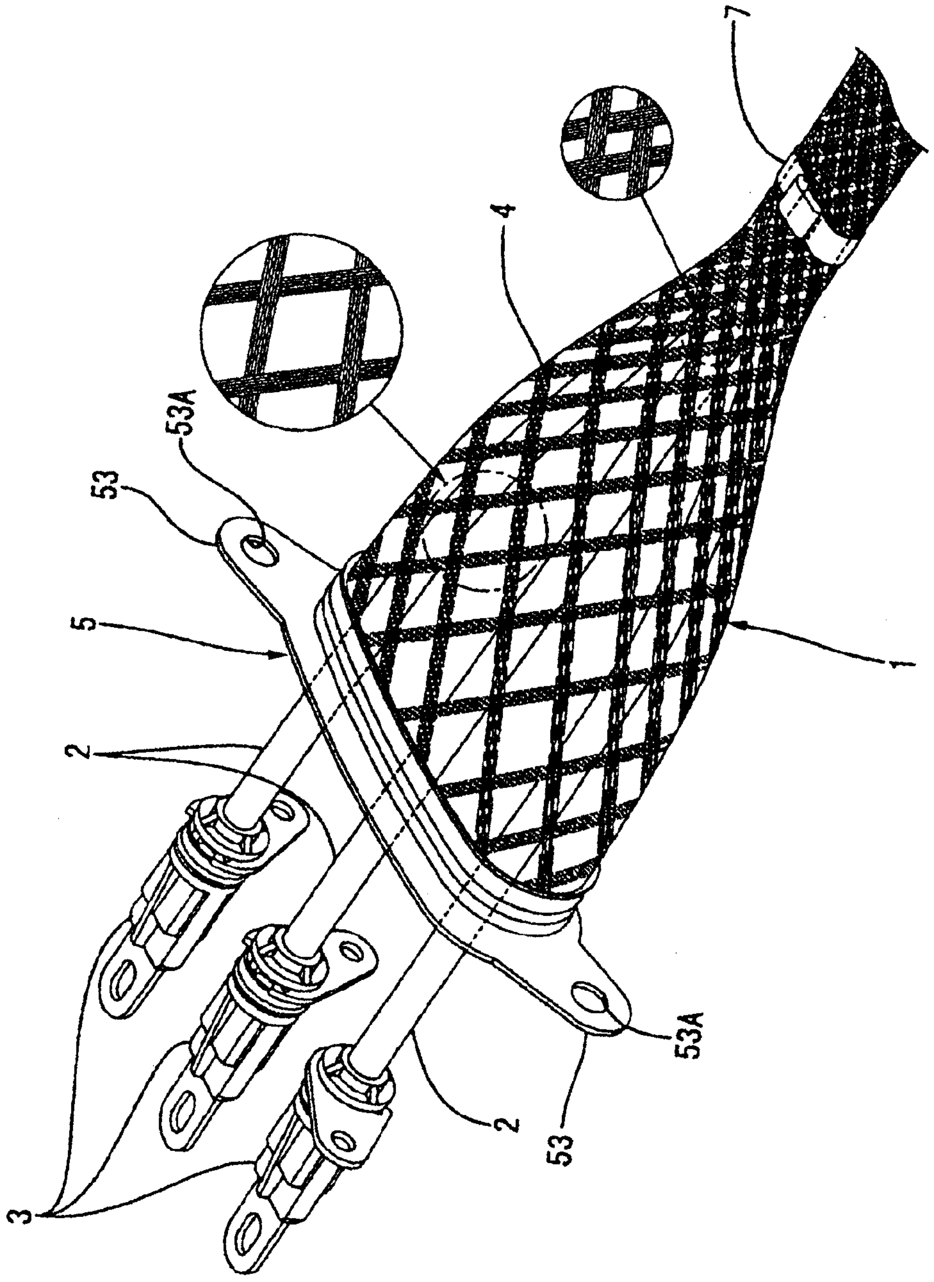
FIG. 1 is a perspective view of a first embodiment of a shielded wire.
Figure 2:
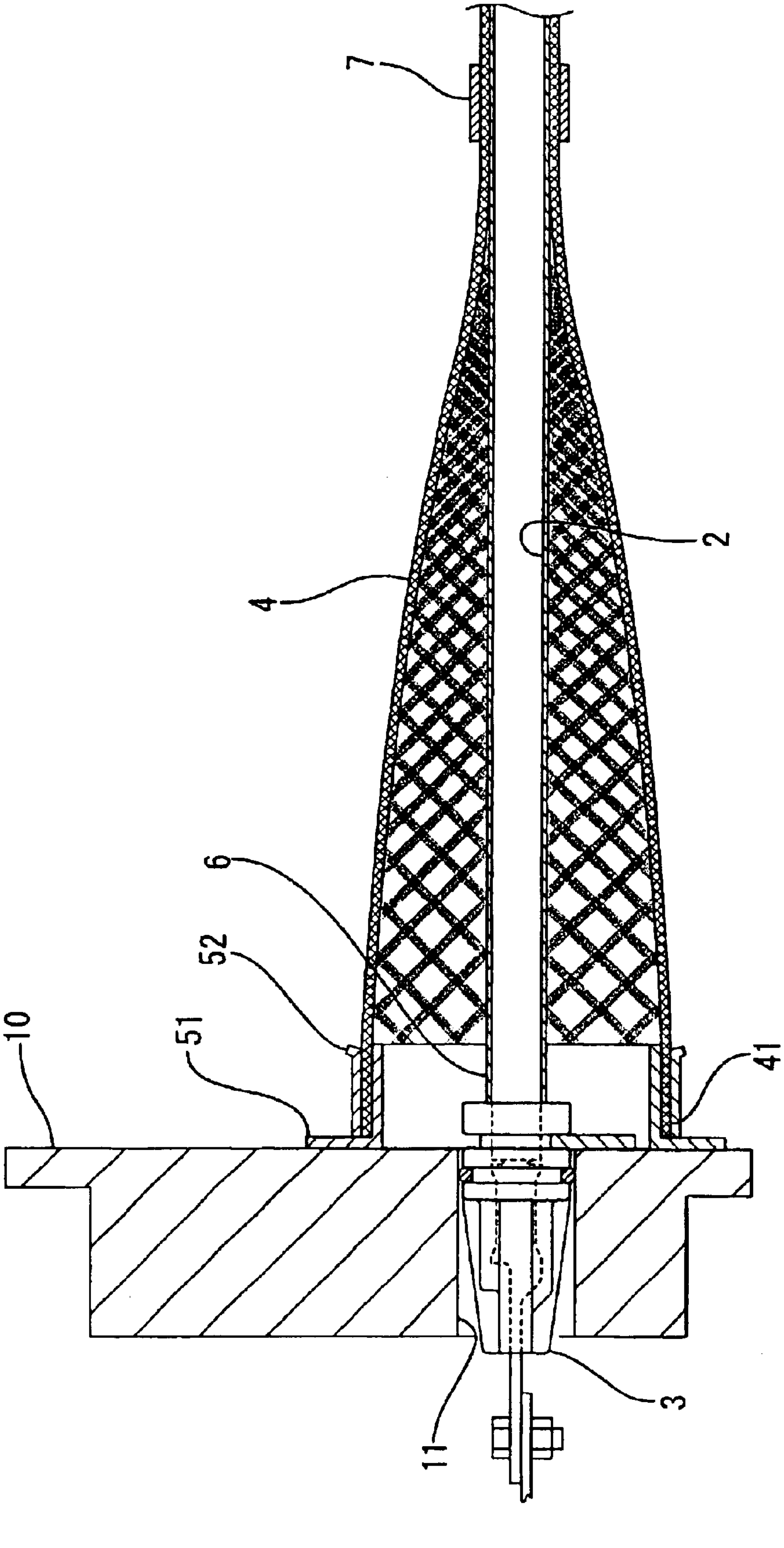
FIG. 2 is a cross-sectional view of the shielded wire of the first embodiment.

Description will be given on an embodiment in which a shielded wire according to the invention is wired in an electric vehicle with reference to FIGS. 1 and 2.

The shielded wire 1 includes three insulated wires 2. The shielded wire 1 is disposed between a power motor (not shown) and an inverter device (not shown) for operating this power motor. A connector 3 is provided at a distal end of each insulated wire 2 at which a core wire of the insulated wire 2 is exposed by removing sheath thereof. These connectors 3 are inserted into attachment holes 11 formed in a shield case 10 containing the inverter device, respectively, so that the connectors 3 is connected with device-side terminals extending from the inverter device.

A tubular braided conductor 4 is provided at a rearward position than the connectors 3 and collectively encloses the insulated wires 2. This braided conductor 4 can be easily deformed. A shield shell 5, which also collectively encloses the insulated wires 2, is provided between the group of connectors 3 and the braided conductor 4. The shield shell 5 includes an inner shell 51 having a laterally wide oval shape, and an outer shell 52, which is fitted from the outside thereof to this inner shell 51. The peripheral sizes of the two shells 51 and 52 are sufficiently larger than diameter of an open end of the braided conductor 4. Plate-like bracket portions 53 each having a bolt hole 53A are formed on outer peripheral edges of the inner shell 51. The plate-like bracket portions 53 project in right and left directions, respectively.

An open end portion 41 of the braided conductor 4 is expanded and is held between the outer peripheral surface of the inner shell 51 and the inner peripheral surface of the outer shell 52. The two shells 51 and 52 are fastened together by caulking in a state in which the open end portion 41 of the braided conductor 4 is held therebetween. As a result, the open end portion 41 of the braided conductor 4 is electrically connected to the shield shell 5. The braided conductor 4 opens with spreading toward the open end portion 41 and mesh size thereof increases gradually toward this open end portion 41.

A heat-shrinkable tube 6 made of an electrically-conductive resin covers each insulated wire 2 from the connector 3 toward the power motor to a position where the braided conductor 4 has the thicker meshes. The, this tube 6 is shrunk to be attached to the insulated wire 2. A metal clamp 7 fastens the outer peripheral surface of the braided conductor 4, which corresponds to end portions of the heat-shrinkable tubes 6, so that the end portions of the heat-shrinkable tubes 6 contact with the braided conductor 4 in an electrically conducting state.

The operation and effects of the shielded wire of the above construction will be described below.

To connect the connectors 3 to the device-side terminals in the shield case 10, the insulated wires 2 are passed through an assembly, which is formed by combining the braided conductor 4 and the inner and outer shells 51 and 52 together in advance. Thereafter, the connectors 3 of the insulated wires 2 are inserted into the attachment holes 11 in the shield case 10, respectively, and are connected to the device-side terminals, respectively. Then, the bracket portions 53 of the inner shell 51 are contacted with the shield case 10 and are secured thereto by fastening bolts, and the clamp 7 is fastened to the outer peripheral surface of the braided conductor 4 to contact the braided conductor 4 with the heat-shrinkable tubes 6.

In the assembled condition, the meshes are expanded to be coarse in the neighbor of the open end portion 41 of the braided conductor 4. Therefore, the shielding performance of this region against electrical noises is low. When electrical noises generated from the inverter device or the like leak through the attachment holes 11, these electrical noises proceed toward the clamp 7 in the heat-shrinkable tubes 6, and are grounded to the shield case 10 via the braided conductor 4 and the shield shell 5.

As a result, even though the meshes of the braided conductor 4 are made more coarse by fitting the braided conductor 4 to the shield shell 5, the noises will not leak from the insulated wires 2 to prevent the shielding performance from being lowered.

The auxiliary shielding layer is formed of the heat-shrinkable tube 6. In addition, the braided conductor 4 and the heat-shrinkable tubes 6 are fastened together in contact by the clamp 7. Therefore, even in an environment in which vibrations are involved as in an electric vehicle, each heat-shrinkable tube 6 will not be displaced with respect to the corresponding insulated wire 2. Also, incomplete contact between the heat-shrinkable tubes 6 and the braided conductor 4 will not occur. Therefore, the good shielding performance can be maintained.

[Second Embodiment]

Figure 3:
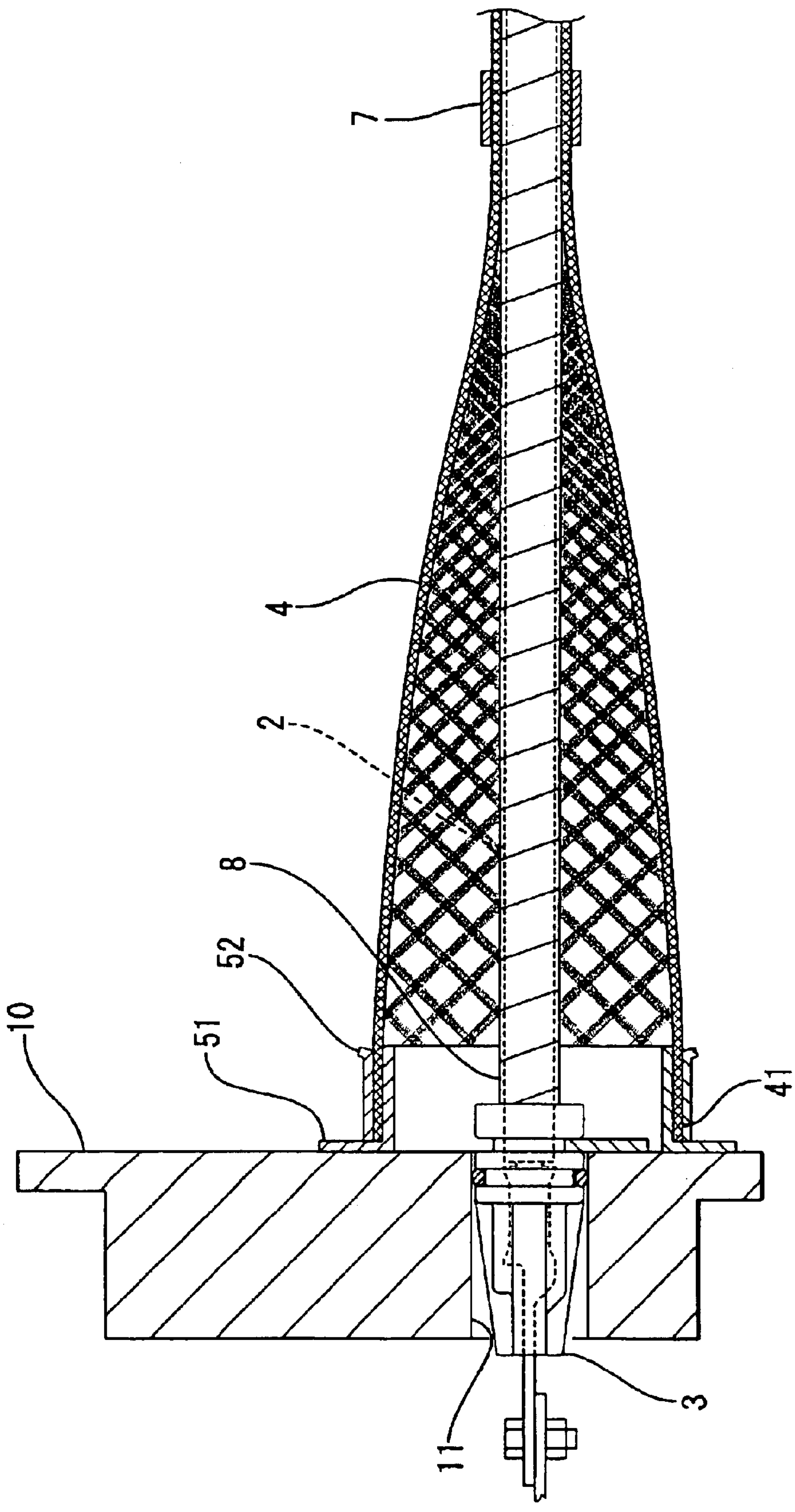
FIG. 3 is a cross-sectional view of a second embodiment of a shielded wire.

FIG. 3 shows a shielded wire according to a second embodiment of the invention. This embodiment differs from the first embodiment in that an auxiliary shielding layer is formed of an adhesive metal tape 8 wound on an insulated wire 2. This construction can be applied in a general-purpose manner to a variety of insulated wires 2 having sheaths of different diameters or having auxiliary shielding layers of different lengths formed respectively thereon.

[Other Embodiments]

The present invention is not limited to the embodiments described above and shown in the drawings. For example, the following embodiments fall within the technical scope of the invention. In addition, various modifications other than the following can be made so long as not departing from the scope of the invention.

(1) In the above embodiments, the insulated wires 2 and the braided conductor 4 are combined together by the metal clamp 7 and are held in a contact state. However, the insulated wires and the braided conductor may be combined together, for example, by fitting a corrugated tube to the outer periphery of the braided conductor. In short, any suitable member can be used in so far as the member can hold the braided conductor and the auxiliary shielding layers in a contact state.

(2) The heat-shrinkable tube 6 is used as the auxiliary shielding layer of the insulated wire 2. However, any suitable material can be used in so far as the material has electrically-conductivity. For example, there may be used a metal paste coated on the insulated wire.

(3) In the above embodiments, the heat-shrinkable tubes 6 are held in contact with that portion of the braided conductor 4 where the meshes are thick. However, the heat-shrinkable tubes may be held in contact, for example, with a portion of the braided conductor where the meshes are more coarse or may be held in contact with the shield case 10. In short, any structure can be used in so far as each auxiliary shielding layer is grounded regardless of whether this is done directly or indirectly.

What is claimed is:

1. A shielded wire, comprising:

an insulated wire;

a tubular braid conductor enclosing the insulated wire;

a shield shell disposed at an end portion of the insulated wire and having a larger diameter than the braid conductor;

an auxiliary shielding layer formed on an outer peripheral surface of the insulated wire in the vicinity of the shield shell where meshes of the braided conductor are coarse; and a fastening member for holding the braided conductor from the outside thereof so that the braided conductor contacts the auxiliary shielding layer, wherein the braided conductor is connected to the shield shell with an opening end portion of the braided conductor being expanded, and the auxiliary shielding layer is electrically connected to the braided conductor.

2. The shielded wire according to claim 1, wherein the fastening member is disposed at a position corresponding to one end portion of the auxiliary shielding layer opposite to the other end portion thereof located in the vicinity of the shield shell.

3. The shielded wire according to claim 1, wherein the auxiliary shielding layer is a heat-shrinkable tube made of a conductive resin, which covers on the insulated wire and is heated to shrink.

4. The shielded wire according to claim 1, wherein the auxiliary shielding layer is a adhesive metal tape, which is wound on the insulated wire.

5. The shielded wire according to claim 1, wherein the shield shell has an inner shell and an outer shell and the open end portion of the braided conductor is held between the inner shell and the outer shell so that the braided conductor is electrically connected to the shield shell.

* * * * *